United States Patent [19]

Krafthefer et al.

[11] 4,452,417
[45] Jun. 5, 1984

[54] VIBRATION ISOLATING MOTOR MOUNT

[75] Inventors: Brian C. Krafthefer, Minneapolis; Rolf L. Strand, White Bear Lake, both of Minn.

[73] Assignee: Honeywell Inc., Minneapolis, Minn.

[21] Appl. No.: 301,630

[22] Filed: Sep. 14, 1981

[51] Int. Cl.³ .......................................... F16M 13/00
[52] U.S. Cl. .................................. 248/604; 248/635
[58] Field of Search .................. 267/140.4; 248/612, 248/672, 603, 604, 605, 606, 619, 635, 650

[56] References Cited

U.S. PATENT DOCUMENTS

| Re. 30,498 | 1/1981 | Baldwin | 248/605 X |
|---|---|---|---|
| 1,935,179 | 8/1930 | Orear | |
| 2,018,180 | 10/1935 | Lawton | 248/619 |
| 2,178,401 | 10/1939 | Meyerhoefer | 248/635 X |
| 2,183,372 | 12/1939 | Thoma | 248/560 |
| 2,208,532 | 7/1940 | Woodward | 248/635 X |
| 2,301,818 | 11/1942 | Sackett | 248/606 |
| 3,506,226 | 4/1970 | Blomgren | 248/604 |
| 4,076,197 | 2/1978 | Dochterman | |
| 4,200,257 | 4/1980 | Litch | |
| 4,253,634 | 3/1981 | Daniels | |
| 4,293,114 | 10/1981 | Lykes | 248/604 |

FOREIGN PATENT DOCUMENTS 1107712 10/1955 France ............................ 267/140.4

Primary Examiner—J. Franklin Foss
Assistant Examiner—David L. Talbott
Attorney, Agent, or Firm—Mitchell J. Halista; Trevor B. Joike

[57] ABSTRACT

A vibration isolating motor mount has a U-shaped mount having the end of the legs of the "U" arranged at right angles thereto to form mounting ears. One leg end ear is arranged to be connected to a motor support plate which is perpendicular to the plane of the legs of the U-shaped mount. The plate is, in turn, attached to a first end of the motor with the plane of the plate being perpendicular to the axis of rotation of the motor. The end ear of the other leg is arranged to be connected to a motor support frame having the plane of the frame also perpendicular to the axis of rotation of the motor. The other end ear may include a vibration absorbing bushing isolating the respective mounting ear while surrounding a mounting pin attached to the support frame. The plane of the legs of the U-shaped mount is arranged to be co-planar with the axis of rotation of the motor. A plurality of the motor mount may be equally spaced on the periphery of the motor support place to provide added support for the motor. A motor shaft is arranged to extend from a second end of the motor to provide an attaching element for a motor driven device, e.g., a pulley, fan, etc.

10 Claims, 5 Drawing Figures

VIBRATION ISOLATING MOTOR MOUNT

BACKGROUND OF THE INVENTION

1. Field of the Invention

The present invention relates to motor mounts. More specifically, the present invention is directed to a motor mount for attaching a motor support structure while providing vibration isolating capabilities.

2. Description of the Prior Art

Motor driven fans used in many ventilating and air conditioning devices often include a direct driven fan mounted on a motor shaft, a motor supporting frame and a panel or fan housing to which the frame is fastened. The panel and frame conventionally have an opening to accommodate the fan with the apparatus being mounted in an opening of an enclosure served by the apparatus, e.g., air conditioner, electrostatic precipitator, etc. While such a fan apparatus often involves attempts to secure a balance of the rotating parts, e.g., the fan and motor armature, those ventilating devices are frequently noisy in operation due mainly to vibration and oscillatory effects in the motor, fan, support frame and panel occasioned by the rapidly rotating and oscillatory parts. Conventional efforts to obviate this vibration problem have included a spring suspension of the fan motor on the motor supporting frame which have inherent limitations inasmuch as the springs must also maintain the motor and fan in a correct running position which substantially minimizing their vibration and noise absorbing capacity. Further, such supports are often of a substantial size which increases the space requirements for the motor support assembly. Accordingly, it would be desirable to provide a motor support having vibration isolating capabilities while maintaining a minimal size to minimize the space requirements within the motor support frame.

SUMMARY OF THE INVENTION

An object of the present invention is to provide an improved motor mount having vibration isolating capabilities.

In accomplishing this and other objects, there has been provided, in accordance with the present invention a U-shaped motor mount having parallel legs extending between a motor support plate located at one end of a motor and a motor support frame with the ends of the legs of each of the motor mounts each having a right angle ear for attachment to the support plate and support frame respectively. The support plate and support frame are each perpendicular to the rotational axis of the motor with the legs of the motor mount being parallel and subtantially co-planar with the rotational axis of the motor.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
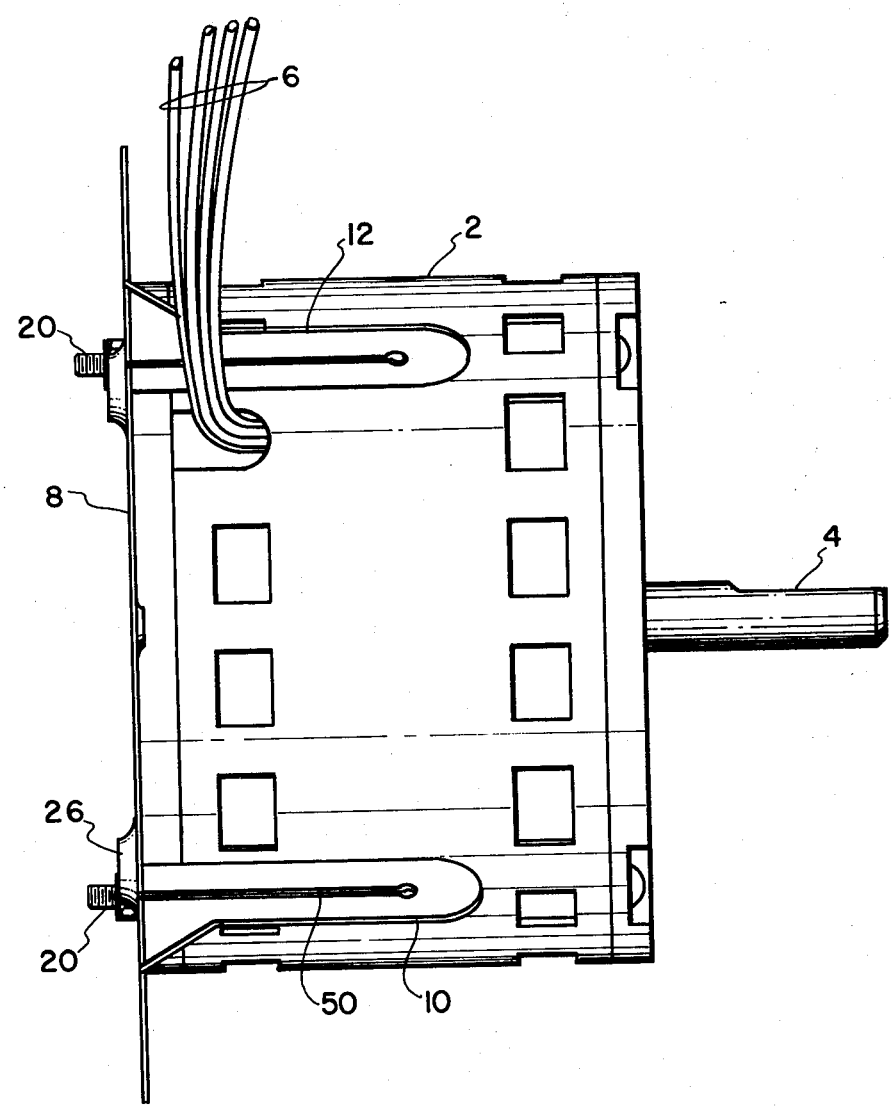
FIG. 1 is a side view of an example of a motor mount embodying the present invention.
Figure 2:
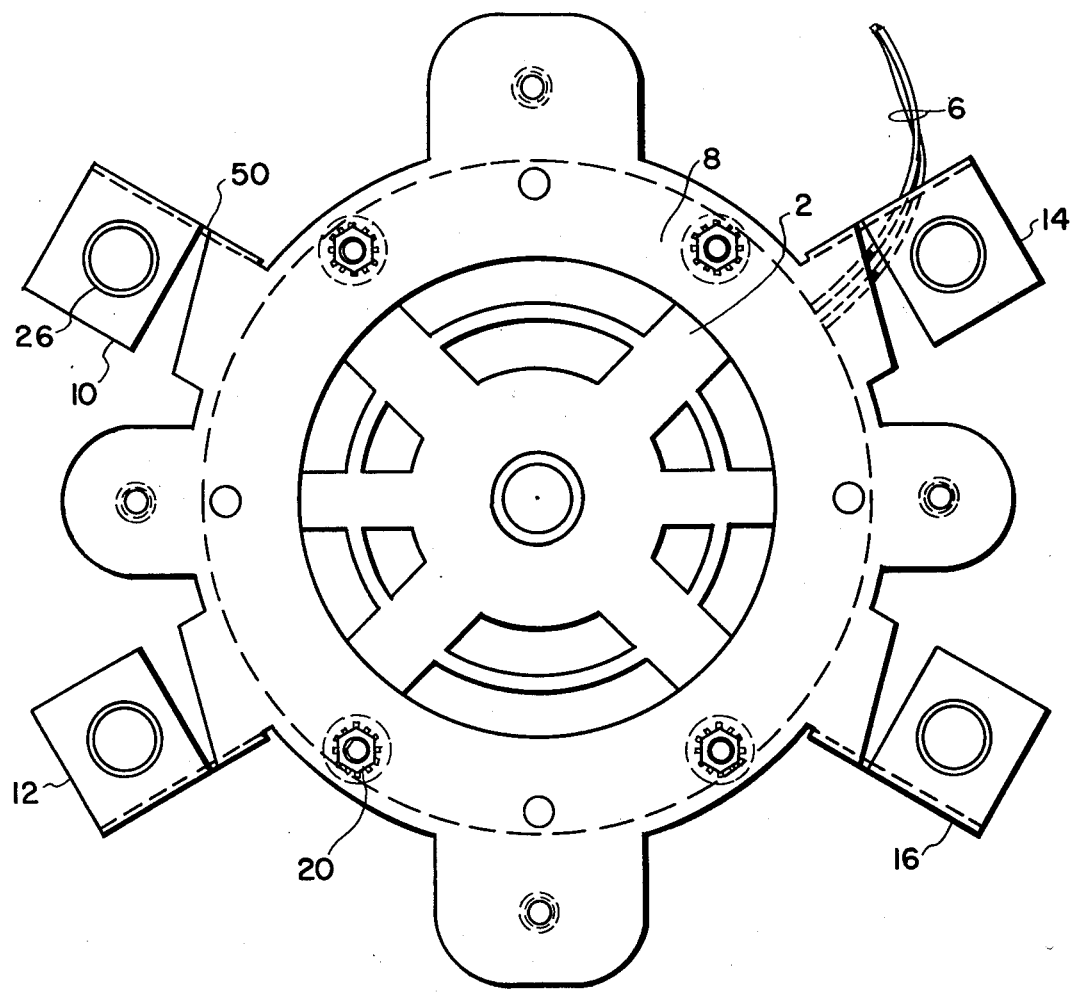
FIG. 2 is an end view of the motor and motor mount shown in FIG. 1.

Referring to FIG. 1 in more detail, there is shown a side view of a motor mount embodying an example of the present invention for supporting an electrical motor 2 having a motor drive shaft 4 which may be connected to a motor driven apparatus by any suitable means (not shown). The motor 2 is connected by electrical wires 6 to a conventional means for energizing the electrical motor 2. A motor support plate 8 mounted on one end of the motor 2 perpendicular to the rotational axis of the motor 2 and has attached thereto a plurality of U-shaped motor mounts 10, 12, 14 and 16. The motor support plate 8 is connected to the motor 2 by a plurality of machine screws extending longitudinally from the motor 2 through the support plate 8 and fastened to the support plate 8 by respective ones of a plurality of nuts 20.

One of the parallel legs of each of the motor mounts 10, 12, 14 and 16 is attached to the periphery of the support plate 8 either by welding or other conventional means or by being integrally formed therewith by a suitable metal stamping process with a subsequent forming of the legs 10, 12, 14 and 16. In either case, the attached leg of each of the motor mounts 10, 12, 14 and 16 is arranged to have a first right angle ear extending from one of the motor mount legs, e.g., ear 24 on motor mount 10. The first right angle ear is utilized to position the corresponding leg of the respective motor mount at substantially a right angle with respect to the plane of the support plate 8, e.g., ear 24 of motor mount 10. Thus, the motor mounts 10, 12, 14 and 16 extend from the support plate 8 parallel to the axis of the motor 2, i.e., the longitudinal axis of the space 50 of each of the U-shaped motor mounts 10, 12, 14 and 16 between the parallel legs thereof is parallel to the rotational axis of the motor 2 while in a preferred orientation the plane of the parallel legs of each of the U-shaped motor mounts 10, 12, 14 and 16 is co-planar with the rotational axis of the motor 2. This orientation of the motor mounts 10, 12, 14 and 16 allows an angular vibration of the motor 2 to be isolated from a supporting surface of the motor mounts 10, 12, 14 and 16. The end of the other one of each of the legs of U-shaped motor mounts 10, 12, 14 and 16 is also terminated in substantially right angle second ears, e.g., ear 25, with each one of the second ears 25 having a hole 26 therein.

Figure 3:
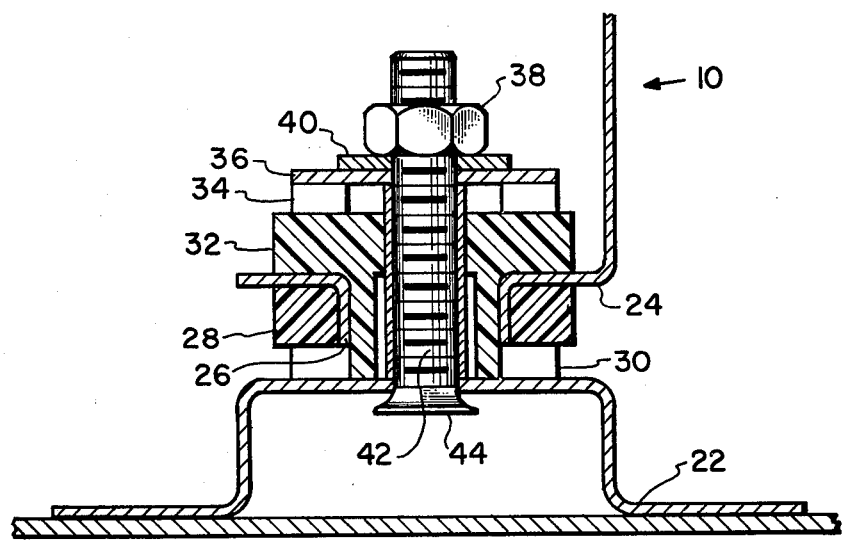
FIG. 3 is a cross-sectional view of the attachment of one leg of the motor mount shown in FIGS. 1 and 2 to a support frame.

In FIG. 3, there is shown a cross-sectional view of the second ear 25 on the U-shaped motor mount 10 as attached to a support frame 27 to illustrate a typical mounting of the second ears of the motor mounts 10, 12, 14 and 16. The support frame 27 is arranged as a hollow box section which is separated from the second ear on the leg of the U-shaped mount 20 by a layered arrangement of a resilient ring 28 in contact with the ear 25 and a first spacing washer 30 between the resilient ring 28 and the mounting frame 27. A resilient bushing 32 is positioned in contact with the other side of the ear 25 from the ring 28 and includes a coaxial cylindrical extension extending through the hole 26 in the ear 25 to the mounting frame 27. A second spacing washer 34 is positioned on top of the resilient bushing 32 and is in contact with a thrust washer 36. A nut 38 and lock washer 40 are located on the other side of the thrust washer 36 from the spacing ring 34 and are mounted on the threaded end of a floating pin 42. The pin 42 has a head 44 at one end thereof located within the hollow frame 27 and overlying the hole 26 whereby the pin 42 serves as a guide for the rubber bushing 32 and thrust washer 36. Thus, the resilient bushing 32 and the resilient ring 28 are effective to isolate the ear 25 of the U-shaped mount 10 from the mount frame 27 while the pin 42 allows a degree of movement of the ear 25 and the bushing 32 to provide a further vibration isolation. The ring 28 and 32 may be made of any suitable resilient material, e.g. rubber.

Figure 4:
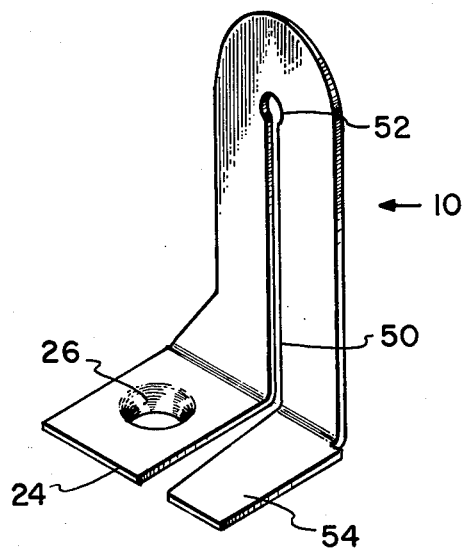
FIG. 4 is an isometric view of one of the motor mounts shown in FIGS. 1 and 2 and FIG. 5 is a pictorial illustration of the motor mount shown in FIGS. 1 and 2 in a fan drive environment.
Figure 5:
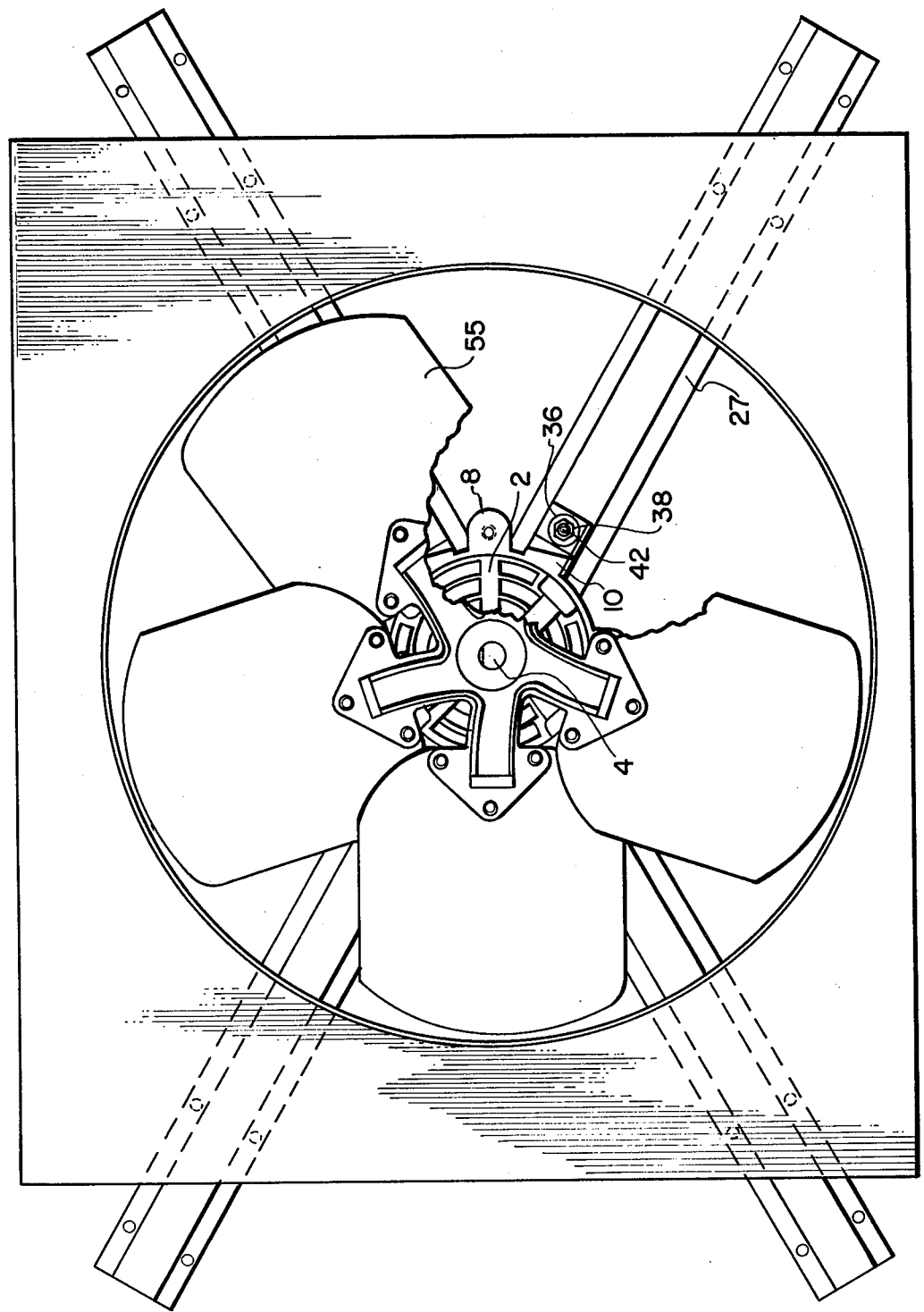

In FIG. 4, there is shown an isometric view of a motor mount, e.g., motor mount 10, embodying an example of the present invention. The U-shaped configuration of the motor mount 10 includes a slot 50 and a hole 52 at the termination of the slot 50 defining the legs of the U-shaped motor mount with the legs terminating in a first mounting ear 24 and a second mounting ear 25. The ears 24 and 25 may be either substantially co-planar or non-co-planar to afford a desired mounting of the motor 2 on the plate 8 and the support frame 27. The motor mounts 10, 12, 14 and 16 may be made of any suitable material having a suitable resiliency and strength, e.g., spring type steel having a thickness of approximately 0.04 inches. In FIG. 6, there is shown a pictorial illustration of the motor mount of the present invention in a fan drive apparatus wherein the motor shaft 14 is arranged to drive a fan 55.

Accordingly, it may be seen that there has been provided, in accordance with the present invention, an improved motor mount having vibration isolating capabilities.

The embodiments of the invention in which an exclusive property is claimed are defined as follows:

1. A motor mount comprising
   a U-shaped mount having parallel legs terminated in right-angle ears,
   a motor support plate arranged to be attached to the end of a motor with a plane of said plate being perpendicular to the axis of rotation of the motor,
   a motor support frame,
   means for attaching a first one of said ears to said plate to orient said U-shaped mount perpendicular to said plane of said plate with said legs being parallel to the axis of rotation of the motor and a plane of said parallel legs substantially co-planar with the axis of rotation of rotation of the motor and
   means for attaching a second one of said ears to said motor support frame.

2. A motor mount as set forth in claim 1 wherein said right-angle ears are susbstantially co-planar.

3. A motor mount as set forth in claim 1 wherein said motor support frame is arranged to be perpendicular to the axis of rotation of the motor.

4. A motor mount a set forth in claim 1 wherein said means for attaching a first one of said ears includes an integral forming of said first one of said ears with said support plate.

5. A motor mount as set forth in claim 1 wherein said means for attaching a first one of said ears includes a weld between said first one of said ears with said support plate.

6. A motor mount as set forth in claim 1 wherein said means for attaching a second one of said ears includes a hole in said second one of said ears, a pin passing through said hole and being captured by said motor support frame and resilient bushing means for isolating said second ear from said pin and said support frame.

7. A motor mount as set forth in claim 1, wherein said means for attaching a second one of said ears includes a resilient means arranged to connect said second one of said ears to said support frame.

8. A motor mount as set forth in claim 1 and further including a plurality of said U-shaped motor mount equally spaced along the periphery of said motor support plate with a first one of the ears of each of said plurality of motor mounts being attached to said plate and a second one of the ears of each of said plurality of motor mounts being attached to said motor support frame.

9. A motor mount as set forth in claim 8 wherein said means for attaching a first one of the ears of each of said plurality of mounts includes an integral forming of said first one of said ears of each of said plurality of mounts with said support plate.

10. A motor mount as set forth in claim 9 wherein said means for attaching a second one of the ears of each of said plurality of mounts includes a resilient means arranged to connect each of said second ears of each of said plurality of mounts to said support frame.

* * * * *